(12) United States Patent
Stephens

(10) Patent No.: US 8,484,886 B2
(45) Date of Patent: Jul. 16, 2013

(54) ANIMAL TRAP

(76) Inventor: Carlis G. Stephens, Warrenton, MO (US)

( * ) Notice: Subject to any disclaimer, the term of this patent is extended or adjusted under 35 U.S.C. 154(b) by 362 days.

(21) Appl. No.: 12/881,241

(22) Filed: Sep. 14, 2010

(65) Prior Publication Data

US 2012/0060405 A1    Mar. 15, 2012

(51) Int. Cl.
*A01M 23/34* (2006.01)

(52) U.S. Cl.
USPC .................................. 43/85; 43/82

(58) Field of Classification Search
USPC ................. 43/58, 81, 82, 85, 86, 87
See application file for complete search history.

(56) References Cited

U.S. PATENT DOCUMENTS

| | | | | |
|---|---|---|---|---|
| 872,041 A * | 11/1907 | Armstrong et al. | ............ | 43/86 |
| 4,158,929 A * | 6/1979 | Custard | ............ | 43/58 |
| 4,341,033 A * | 7/1982 | Siegel | ............ | 43/81 |
| 4,471,560 A * | 9/1984 | Hughan | ............ | 43/85 |
| 4,483,093 A | 11/1984 | Isborn | | |
| 4,601,128 A * | 7/1986 | Danison | ............ | 43/82 |
| 4,633,610 A * | 1/1987 | Thompson | ............ | 43/85 |
| 4,802,301 A * | 2/1989 | Isborn et al. | ............ | 43/58 |
| 5,309,667 A * | 5/1994 | Ladzinski | ............ | 43/87 |
| 5,862,624 A | 1/1999 | Askins | | |
| 6,658,787 B1 * | 12/2003 | Bonnot | ............ | 43/58 |
| 7,543,407 B2 * | 6/2009 | McCulloch | ............ | 43/86 |
| 8,230,642 B2 * | 7/2012 | Ziegmann | ............ | 43/85 |
| 2005/0274057 A1 * | 12/2005 | McCulloch | ............ | 43/85 |
| 2010/0275503 A1 * | 11/2010 | Ziegmann | ............ | 43/85 |

OTHER PUBLICATIONS

Carlis G. Stephens; Pictures of Product with Straight Trigger (first 5 pictures with the latch dog not attached; last picture of latch dog); Sold in U.S. by at least 2007.

* cited by examiner

*Primary Examiner* — Rob Swiatek
*Assistant Examiner* — Justin Benedik
(74) *Attorney, Agent, or Firm* — Neustel Law Offices

(57) ABSTRACT

An animal trap for restraining animals, such as raccoons. The trap includes a hollow body having an entrance opening, an external and an internal grip member spaced apart along a longitudinal axis of the body, both having a V-shape, and a biased restraint member having a V-shape and adapted to move towards the grip members when released to engage an extremity of an animal inserted through the entrance opening. Two interchangeable trigger assemblies are each adapted to restrain the restraint member until proper engagement with a respective trigger member. The first trigger assembly releases the restraint member via a first directional force or an opposite second directional force applied to a first trigger member. The second trigger assembly releases the restraint member via only the first directional force applied to a second trigger member. A ground stake having jagged teeth and a swivel chain may be used for anchoring.

17 Claims, 13 Drawing Sheets

ANIMAL TRAP

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to a trap and more specifically it relates to an animal trap for efficiently restraining animals, such as raccoons, in a secure manner using a diamond-shaped restraint and having an interchangeable and easy-setting trigger which allows for a push-pull type or a pull-only type trigger and having an easy clean-out system for the trap.

2. Description of the Related Art

Any discussion of the related art throughout the specification should in no way be considered as an admission that such related art is widely known or forms part of common general knowledge in the field.

Various types of traps currently exist and are utilized to catch animals, such as raccoons. Current traps are generally either have a push or a pull-type trigger thus either not efficiently providing a means to engage the trap, wherein the animal may possibly retrieve the bait without causing the trap to engage, or not complying with local ordinances or laws. In addition, the traps are often enclosed in such a manner that it may be difficult to reset and/or clean the trap. Additionally, many of the traps have problems holding the animal after a catch and must rely on stronger springs, thus increasing the weight, the expense, the difficulty of setting the trap, as well as the danger of the trap to the trapper.

Because of the inherent problems with the related art, there is a need for a new and improved animal trap for efficiently restraining animals, such as raccoons, in a secure manner using a diamond-shaped restraint with spaced grip bars for increasing holding power and having an interchangeable and easy-setting trigger which allows for a push-pull type or a pull-only type trigger and having an easy clean-out system for the trap.

BRIEF SUMMARY OF THE INVENTION

A system for efficiently restraining animals, such as raccoons, in a secure manner using a diamond-shaped restraint with spaced grip bars for increasing holding and having an interchangeable and easy-setting trigger which allows for a push-pull type or a pull-only type trap and having an easy clean-out system for the trap. The invention generally relates to a trap which includes a hollow body having an entrance opening, an external and an internal grip member spaced apart along a longitudinal axis of the body, both having a V-shape, and a biased restraint member having a V-shape and adapted to move towards the grip members when released to engage an extremity of an animal inserted through the entrance opening. Two interchangeable trigger assemblies are each adapted to restrain the restraint member until proper engagement with a respective trigger member. The first trigger assembly releases the restraint member via a first directional force or an opposite second directional force applied to a first trigger member. The second trigger assembly releases the restraint member via only the first directional force applied to a second trigger member. A ground stake having jagged teeth and a swivel chain may be used for anchoring.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

Figure 1:
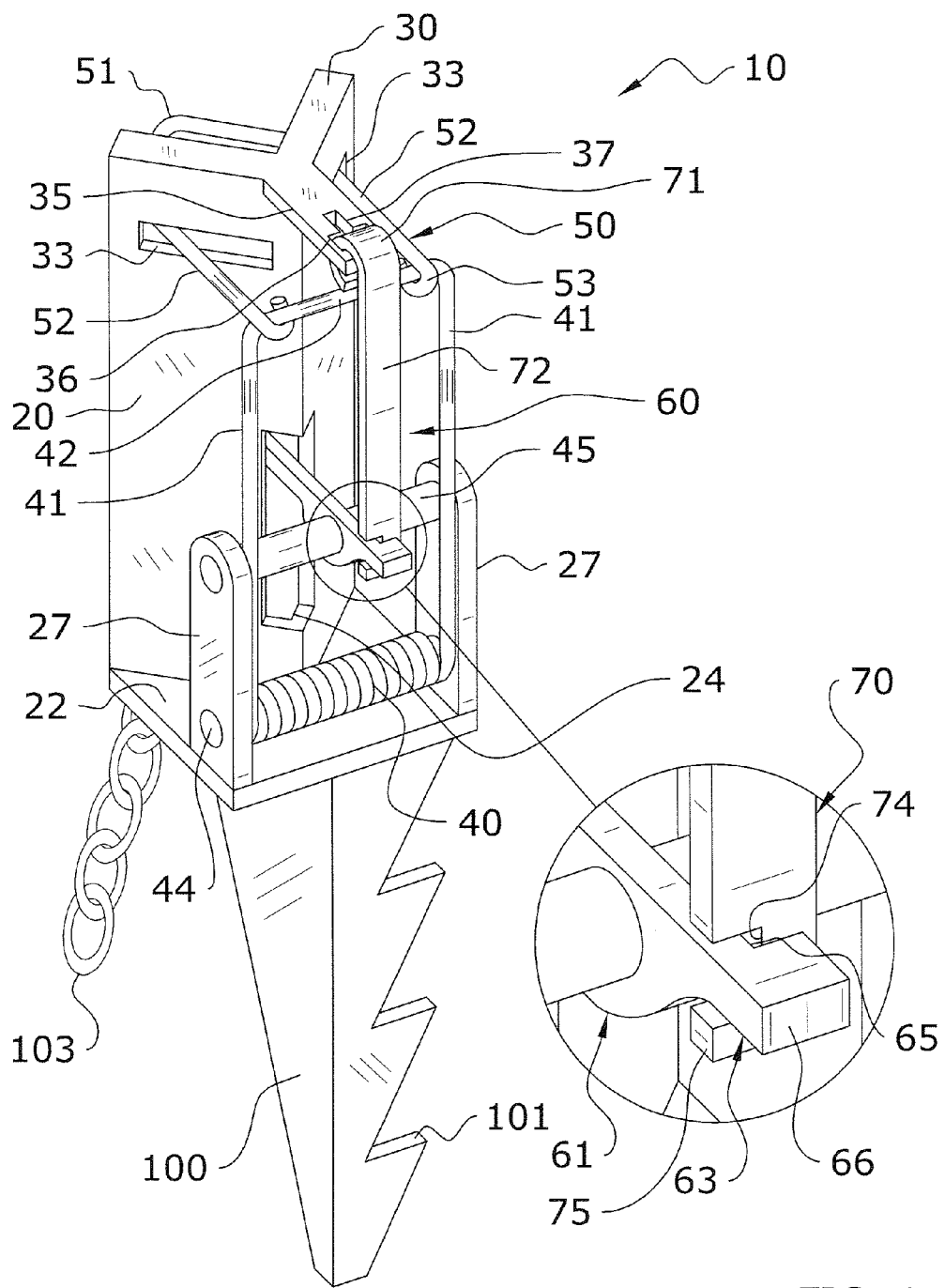
FIG. 1 is a rear upper perspective view of the present invention with the first trigger assembly in the safety position.

A. Overview.

Turning now descriptively to the drawings, in which similar reference characters denote similar elements throughout the several views, FIGS. 1 through 13 illustrate a animal trap 10, which comprises a hollow body 20 having an entrance opening 21, an external and an internal grip member 30, 39 spaced apart along a longitudinal axis of the body 20, both having a V-shape, and a biased restraint member 50 having a V-shape and adapted to move towards the grip members 30, 39 when released to engage an extremity 12 of an animal inserted through the entrance opening 21. Two interchangeable trigger assemblies 60, 80 are each adapted to restrain the restraint member 50 until proper engagement with a respective trigger member 61, 81. The first trigger assembly 60 releases the restraint member 50 via a first directional force or an opposite second directional force applied to a first trigger member 61. The second trigger assembly 80 releases the restraint member 50 via only the first directional force applied to a second trigger member 81. A ground stake 100 having jagged teeth 101 and a swivel chain 103 may be used for anchoring the animal trap 10.

The animal trap 10 is generally a foot-trapping structure and may be oriented vertically, horizontally, or at various other angles suitable to the adjacent terrain and the particular animal being trapped. The animal trap 10 is generally comprised of a metal material for strength and durability and may have various properties thereon to reduce, prevent, or eliminate rust, scent, and other elements damaging to the animal trap 10 and undesirable for trapping animals. The animal trap 10 may be manufactured in various sizes to trap various types of animals.

B. Hollow Body.

The animal trap 10 includes a hollow body 20 generally comprised of a square-tubular shape for positioning bait within, wherein the animal extends an extremity 12, such as a foot, within the entrance opening 21 of the hollow body 20 to retrieve the bait, wherein the restraint member 50 retains their extremity 12 within the hollow body 20. The diameter of the body 20 is preferably small enough to prevent a dog or other household pet from being able to reach within the body 20 through the entrance opening 21, but is large enough to allow a raccoon or other desired trappable animal to reach within the body 20 through the entrance opening 21.

The body 20 is elongated in structure so the bait may be distally spaced from the entrance opening 21 to allow room for the trigger member 61 or 81 between the entrance opening 21 and the bait. The first longitudinal end of the body 20 includes the entrance opening 21 and the second longitudinal end of the body 20 is closed by a base plate 22. The body 20 includes at least one lower opening 24 extending through a longitudinal corner of the body 20 for the trigger member to extend within the body 20. The base plate 22 may also have a drain 23, such as at the point that the chain 103 connects.

The lower opening 24 and thus trigger member are located between the plate 22 and the opening 21 and the lower opening 24 is elongated to allow for the trigger member 61 or 81 to pivot within the body 20. The lower opening 24 is also large to allow for easy cleaning and resetting of the animal trap 10.

C. External Grip Member.

Extending from the first longitudinal end of the body 20, along a longitudinal axis of the body 20 and preferably integral with a portion of the peripheral edge of the body 20, is the external grip member 30. The external grip member 30 is generally V-shaped and thus extends two of the four sides of the body 20. The external grip member 30 extends forwardly from the first longitudinal end thus spacing the forward end of the external grip member 30 from the entrance opening 21 of the body 20.

The external grip member 30 may also have a brim surrounding a peripheral edge, thus forming a recess 31 to allow the restraint member 50 to move further across the entrance opening 21 and better prevent animals from being able to remove their extremity 12 from the animal trap 10 once the restraint member 50 has been released. The external grip member 30 also includes a pair of elongated slots 33 extending therethrough along each side of the V-shaped grip member for receiving the restraint member 50. The slots 33 are preferably separated to prevent the restraint member 50 from being removed from the external grip member 30.

Extending outwardly from the apex of the V-shaped external grip member 30 is a support 35. The support 35 is for retaining the latch dogs and generally includes a first notch 36 and a second notch 37. The first notch 36 and the second notch 37 form a T-shape with the first notch 36 extending across the support 35 and the second notch 37 extending parallel to a length of the support 35. It is appreciated that the support 35, external grip member 30, and hollow body 20 may be comprised of an integral one-piece structure or multiple components attached together.

D. Internal Grip Member.

Figure 13:
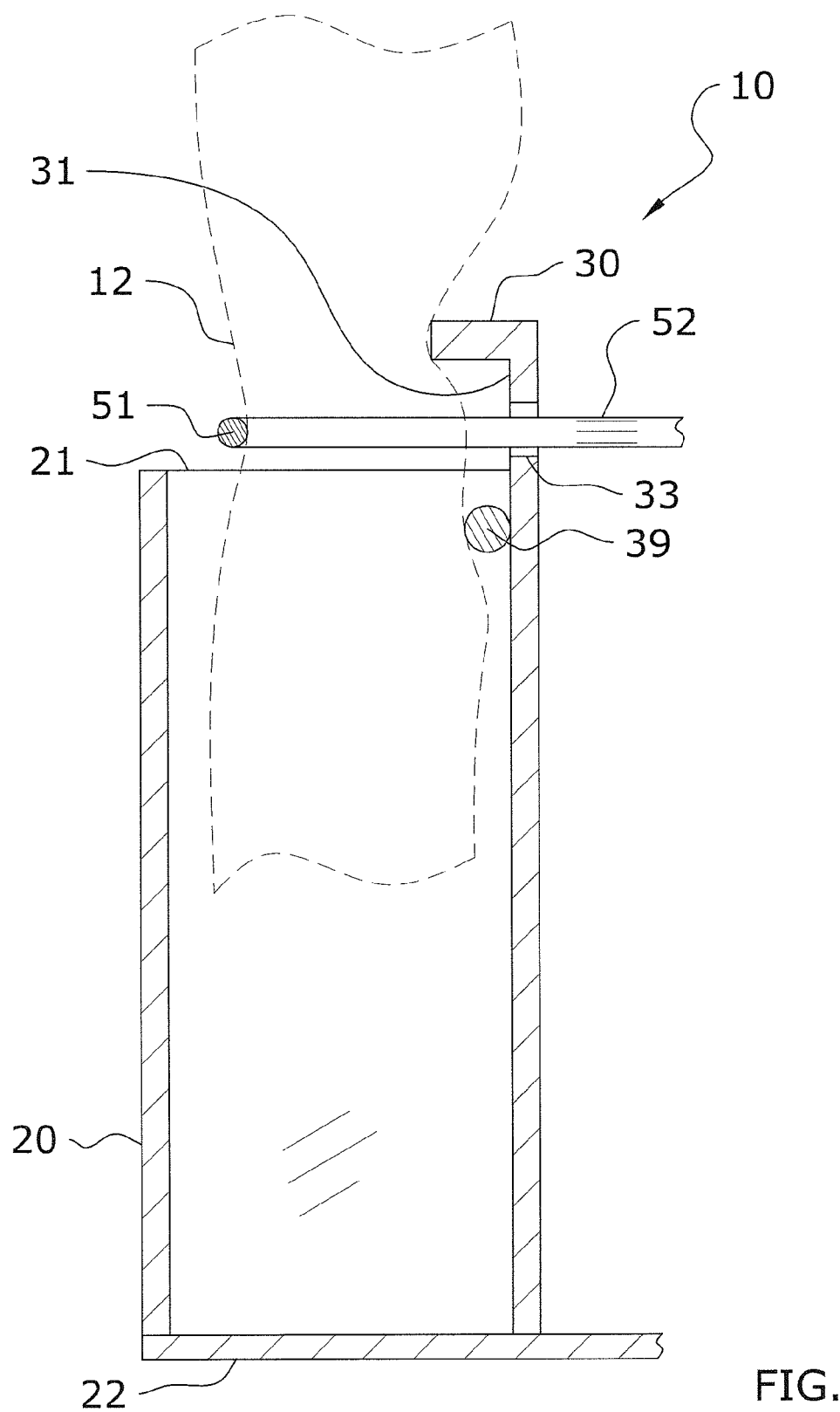
FIG. 13 is a side sectional view of the present invention with the extremity of the animal restrained.

The internal grip member 39 is generally located adjacent the entrance opening 21 and extends slightly inwardly from a peripheral edge of the body 20 along the first longitudinal end. The internal grip member 39 is V-shaped and parallels the external grip member 30. The internal grip member 39 preferably extends inwardly past the recess 31 to a point aligned with the forward edge of the external grip member 30. The slots 33 of the external grip member 30 are positioned between the forward edge of the external grip member 30 and the internal grip member 39 as appreciated as illustrated in FIG. 13.

E. Spring Assembly.

Along with closing the end of the body 20, the base plate 22 extends outwardly from the body 20. Preferably two supports 27 extend from the outward portion of the base plate 22. Laterally extending across a lower end of the supports 27 is a lower pivot 44 and extending across an upper end of the supports 27 is an upper pivot 45. A double-legged torsion spring 40 is wound around the lower pivot 44 and includes a pair of spaced apart extension legs 41, each extension leg 41 extending from an end of the torsion spring 40.

The extension legs 41 extend along the longitudinal length of the body 20 to a point past the slots 33 of the external grip member 30. A cross member 42 connects the extension legs 41 at a distal end. The cross member 42, extension legs 41, and spring 40 are preferably integrally formed so that a bias force from the spring 40 may be transferred to the extension legs 41 and cross member 42 for being applied to the restraint member 50.

F. Restraint Member.

The restraint member 50 is connected to the distal end of the extension legs 41 or cross member 42 and extends laterally therefrom through the slots 33 of the external grip member 30. The spring 40 imparts a bias force upon the restraint member 50 to pull the restraint member 50 outwardly towards the external grip member 30 to restrain the extremity 12 of the animal between the restraint member 50 and the grip members 30, 39. A majority of the restraint member 50 is exposed thus allowing for easy cleaning and resetting of the animal trap 10.

The restraint member 50 is generally comprised of a wire structure and includes a restraining portion 51, extension legs 52 extending from opposing ends of the restraining portion 51, and hook portions 53 located at the end of the extension legs 52. The restraining portion 51 is generally comprised of a V-shaped structure and is oriented opposite the grip members 30, 39 so that the restraining portion 51 forms a square cross-sectional shape with the grip members 30, 39 to engage the extremity 12 of the animal on all four sides of the extremity 12. The extension legs 52 movably extend through the slots 33 of the external grip member 30 towards the respective extension leg 41 of the spring 40. At the end of the extension legs 52 of the restraint member 50 is the hook portion 53 to secure the restraint member 50 to the extension legs 41 or cross member 42 of the spring 40.

G. First Trigger Assembly.

As illustrated in FIGS. 1 through 6, the first trigger assembly 60 releases the restraint member 50 via a first directional force (i.e. pulling towards entrance opening 21) or an opposite second directional force (i.e. pushing towards base plate 22) applied to a first trigger member 61. The first trigger assembly 60 generally includes the first trigger member 61 and a first latch dog 70, wherein the first trigger member 61 is releasable from the first latch dog 70 and the first latch dog 70 is pivotally connected to the first notch 36 of the support 35 of the external grip member 30 via a hook portion 71 extending from a retaining shaft 72 of the first latch dog 70.

The first trigger member 61 includes a trigger end 62 internal to the hollow body 20 and a connector end 63 external to the hollow body 20, wherein the first trigger member 61 is pivotally and generally slidably connected to the upper pivot 45 between the trigger end 62 and the connector end 63 along the shaft 64 at a point external to the hollow body 20. The shaft 64 is linear and connects the trigger end 62 to the connector end 63 by extending through the lower opening 24 of the body 20.

The trigger end 62 of the first trigger member 61 is generally comprised of a ring-shape thus encompassing a substantial portion of a cross-sectional area within the hollow body 20 to prevent the animal from reaching around the trigger end 62 of the first trigger member 61 when attempting to access the bait.

The connector end 63 preferably includes a notch 65 formed therein and spaced slightly inwardly. The notch 65 is used to interlock with a notch 74 of the first latch dog 70 to retain the first trigger member 61 in a safety position and thus prevent the first latch dog 70 from releasing the restraint member 50. A tab 66 is formed at the distal end of the first trigger member 61. Along with engaging the first latch dog 70 in the safety position to retain the notches 65, 74 interlocked, the tab 66 is used to rest upon a distal tab 75 of the first latch dog 70 when in the armed position.

The first trigger member 61 is slid along the upper pivot 45 from the safety position to the armed position. In the safety position, the first trigger member 61 is slid towards the first latch dog 70 so the notches 65, 74 may interlock. In the armed position, the first trigger member 61 is slid away from the first latch dog 70 so the tab 66 of the first trigger member 61 rests upon the tab 75 of the first latch dog 70 and the tab 66 of the first trigger member 61 is able to pass through the notch 74 of the first latch dog 70 when the trigger end 62 of the first trigger member 61 is pushed towards the base plate 22. The trigger end 62 of the first trigger member 61 may also be pulled towards the entrance opening 21 to release the restraint member 50, wherein the tab 66 moves outward past an outer end of the first latch dog 70.

H. Second Trigger Assembly.

Figure 9:
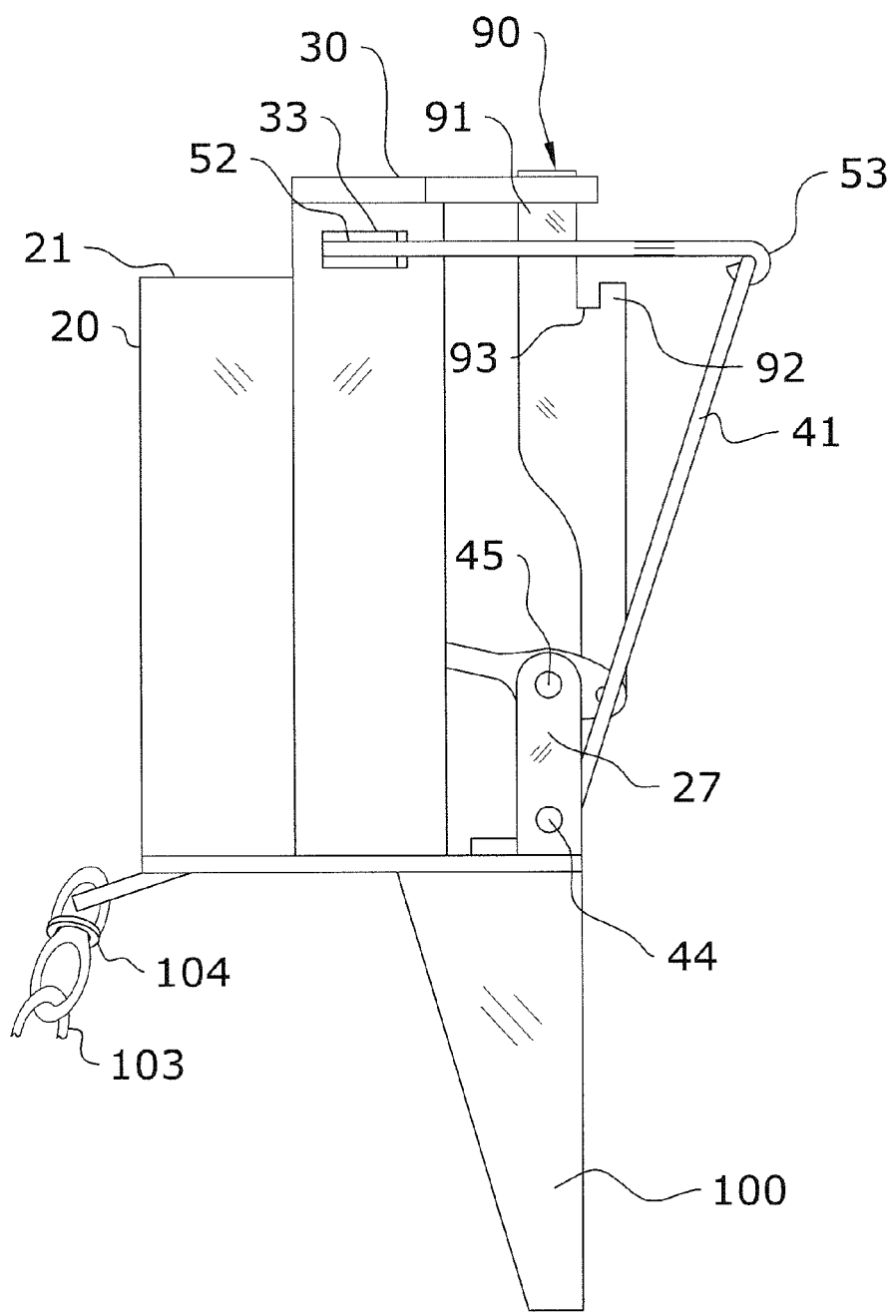
FIG. 9 is a side sectional view of the present invention with the second trigger assembly with the spring disengaged.
Figure 10:
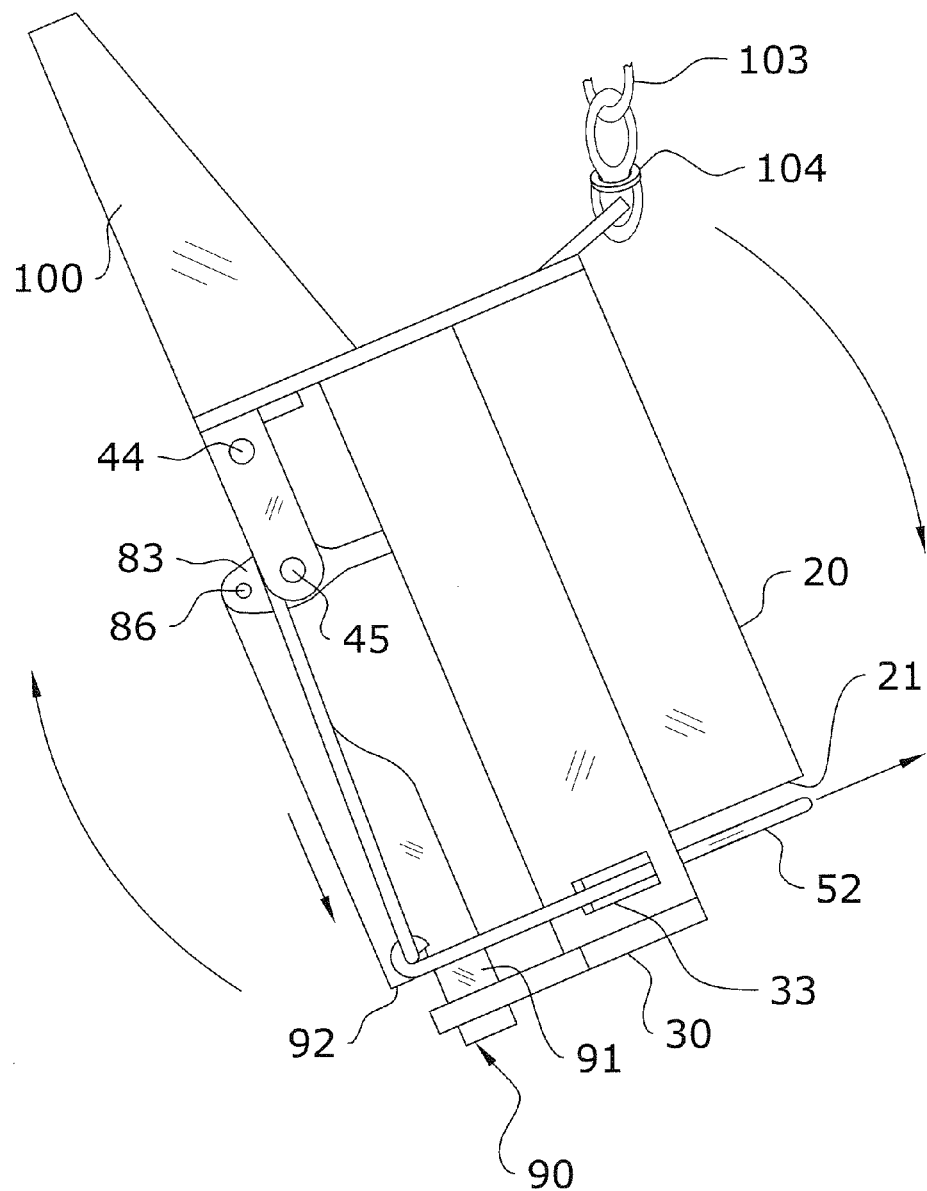
FIG. 10 is a side sectional view of the present invention with the second trigger assembly with the spring engaged and the trap rotated so that the latch dog of the second trigger assembly falls into place to retain the spring in the engaged position.
Figure 11:
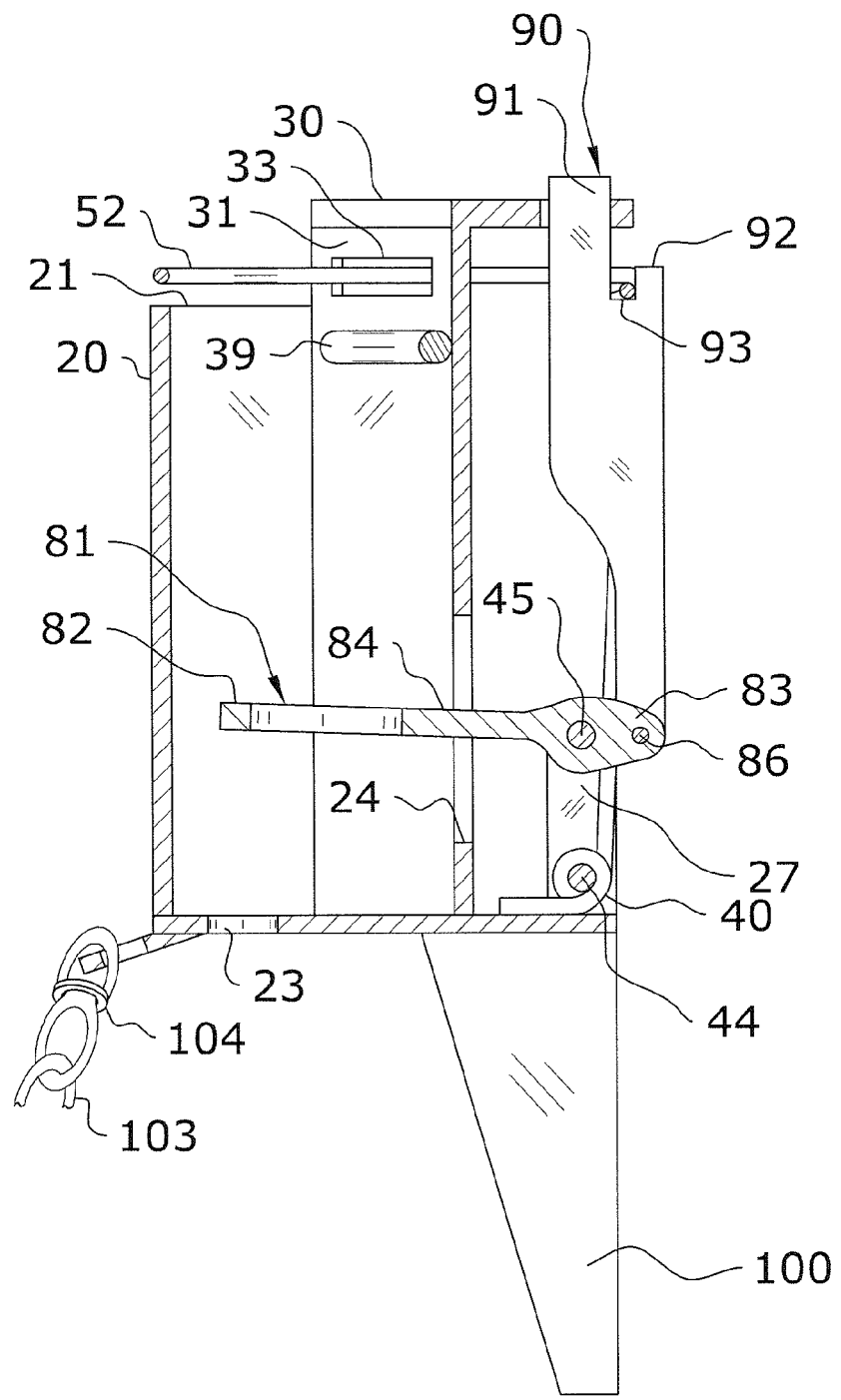
FIG. 11 is a side sectional view of the present invention with the second trigger assembly in the engaged position.

As shown in FIGS. 9 and 10, the second trigger assembly 80 allows for easy setting of the trap 10 using a heavy latch dog 90 and gravitational force, thus the second latch dog 90 being heavier than the second trigger member 81 to pull or pivot the trigger member 81 as the second latch dog 90 falls downward over the cross member 42. When the second trigger assembly 80 is desired to be armed, the spring 40 is armed by pushing the cross member 42 towards the body 20 and tilting the opening down toward the ground allowing the heavier latch dog 90 to fall forward over the cross member 42 so the cross member 42 is positioned within the notch 93 of the of the second latch dog 90 and the cross member 42 is retained in position by the second extension 92 while the first extension 91 is extended within the second notch 37 of the support 35 to retain the second latch dog 90 in position when pressure is released from the spring 40 as illustrated in FIGS. 10 and 11. Thus, the latch dog 90 allows for easy setting of the trap 10 by simply pushing the spring 40 toward the body 20 and pivoting the body 20 so the latch dog 90 pivots into a set position to retain the spring 40 in the armed position.

As illustrated in FIGS. 7 through 12, the second trigger assembly 80 releases the restraint member 50 via only a first directional force (i.e. pulling towards entrance opening 21) applied to a second trigger member 81. The second trigger assembly 80 generally includes a second trigger member 81 and a second latch dog 90, wherein the second trigger member 81 is releasable from the second notch 37 of the support 35 of the external grip member 30 and is pivotally connected to the connector end 83 of the second trigger member 81. The extensions 91, 92 extend from a shaft 95 of the second latch dog 90 that extends toward an opposing pivotally connected end of the second latch dog 90.

The second trigger member 81 includes a trigger end 82 internal to the hollow body 20 and a connector end 83 external to the hollow body 20, wherein the second trigger member 81 is pivotally and generally slidably connected to the upper pivot 45 between the trigger end 82 and the connector end 83 along the shaft 84 at a point external to the hollow body 20. The shaft 84 is linear and connects the trigger end 82 to the connector end 83 by extending through the lower opening 24 of the body 20.

The trigger end 82 of the second trigger member 81 is generally comprised of a ring-shape thus encompassing a substantial portion of a cross-sectional area within the hollow body 20 to prevent the animal from reaching around the trigger end 82 of the second trigger member 81 when attempting to access the bait.

The connector end 83 preferably includes a pivot outwardly from the upper pivot 45 for pivotally connecting to an end of the second latch dog 90. The opposing end of the second latch dog 90 includes a first extension 91 for being received in the second notch 37 of the support 35, a second extension 92 for holding the outer side of the cross member 42 to retain the spring 40 and restraint member 50 in the armed position and a notch 93 positioned between the first extension 91 and the second extension 92 for receiving the cross member 42. Thus, the second trigger member 81 is fixed to the second latch dog 90 and the second latch dog 90 releases from the support 35 of the external grip member 30 to engage the restraint member 50 and restrain the extremity 12 of the animal.

I. Anchoring Structure.

Various anchoring structures may be used to retain the animal trap 10 in position to prevent the trapped animal from leaving with the trap once restrained within the body 20 by the restraint member 50. Preferably a ground support 100 extends from the base plate 22 parallel and linear with the body 20. The ground support 100 (e.g. ground stake) is elongated and may include numerous jagged teeth 101 in series for grabbing the ground or adjacent structure.

Additionally, a chain 103 preferably extends from the animal trap 10 and may be retained via a swivel 104 attached to the base plate 22, body 20, ground support 100, or other components of the animal trap 10. The distal end of the chain 103 is then secured to a fixed structure. Further, a tubular member 102 may be located along the ground support 100 and parallel a longitudinal axis of the ground support 100. The tubular member 102 may be used for receiving a support rod that is driven into the ground for support, such as when the ground is frozen and it may be difficult to position the ground support 100 within the ground or additional support is needed.

J. Operation of Preferred Embodiment.

In use, it is first determined whether the first trigger assembly 60 or the second trigger assembly 80 is desired. Generally, the first trigger assembly 60 provides the optimal method of catching the animal since the first trigger assembly 60 can be engaged via a pushing or pulling force. However, some ordinances or laws allow only a pushing or a pulling force, and not both, upon traps, and thus in these instances the second trigger assembly 80 may be used.

When using the first trigger assembly 60, the first trigger member 61 may be retained in the safety position while preparing the adjacent area and mounting the animal trap 10. To put the first trigger member 61 in the safety position, the first trigger member 61 is slid towards the first latch dog 70 and the notch 65 of the first trigger member 61 is interlocked with the notch 74 of the first latch dog 70 as illustrated in FIG. 1.

Figure 2:
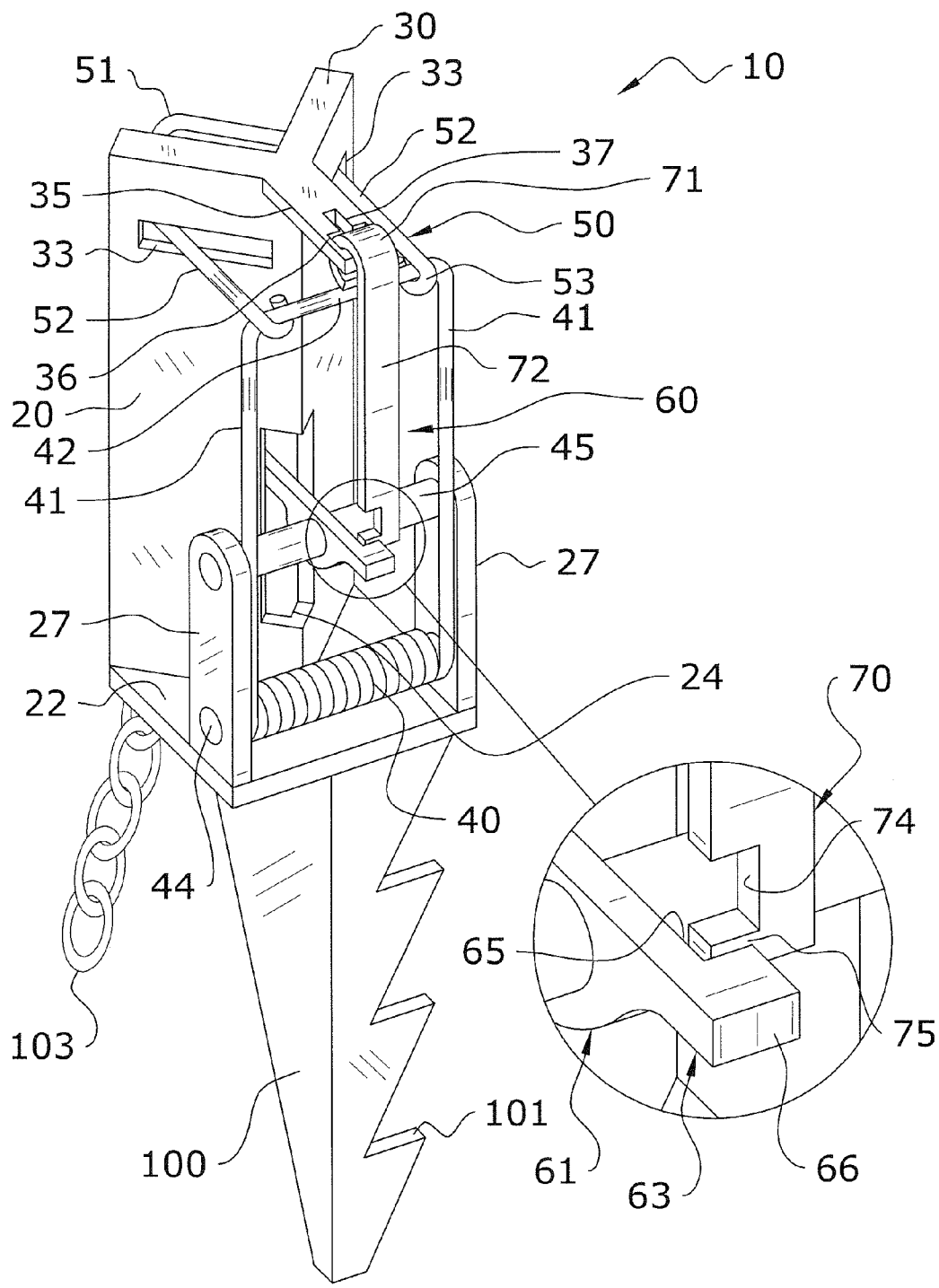
FIG. 2 is a rear upper perspective view of the present invention with the first trigger assembly in the armed position.
Figure 3:
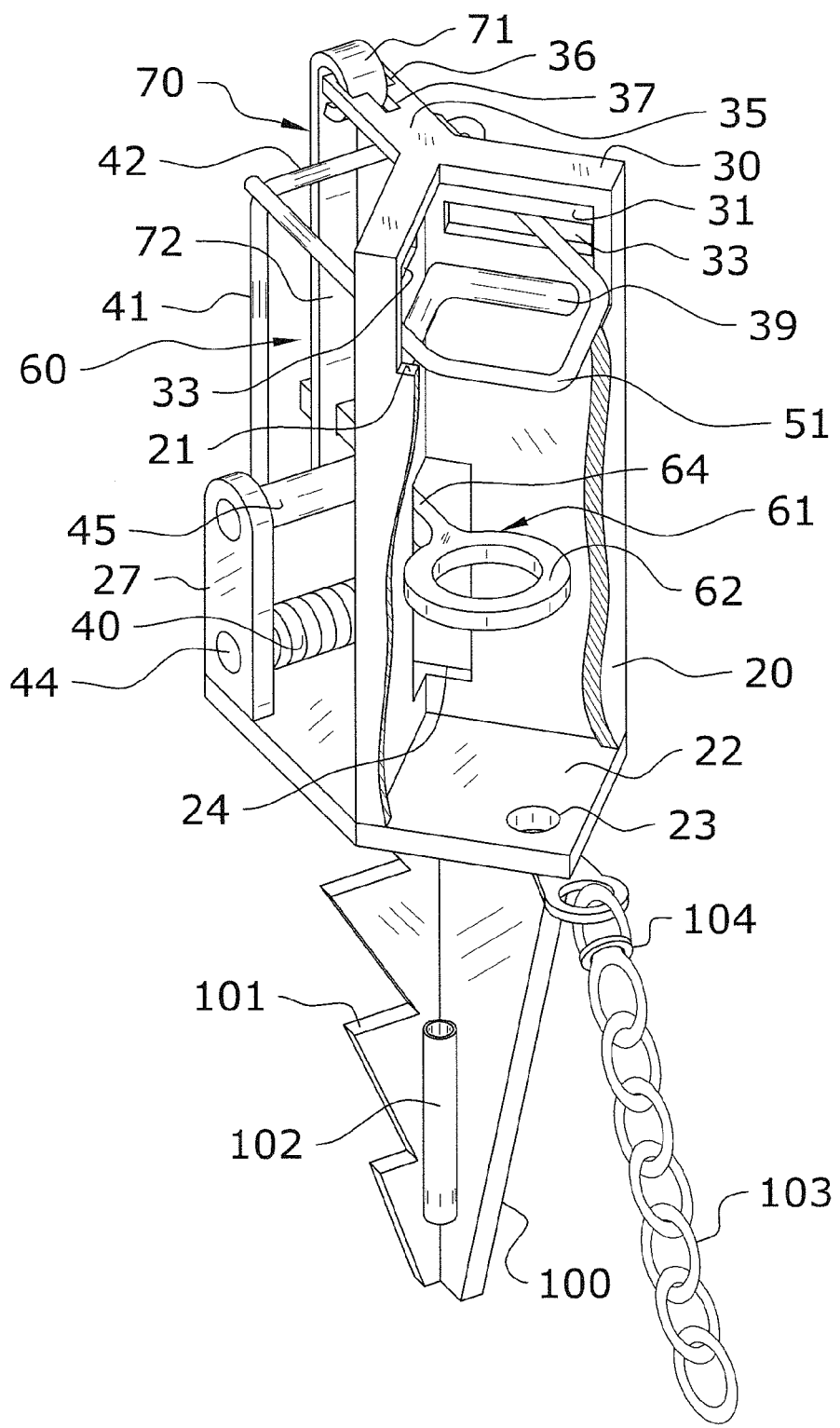
FIG. 3 is a front upper perspective view of the present invention with a portion of the body cutaway to show the trigger end of the first trigger member.
Figure 4:
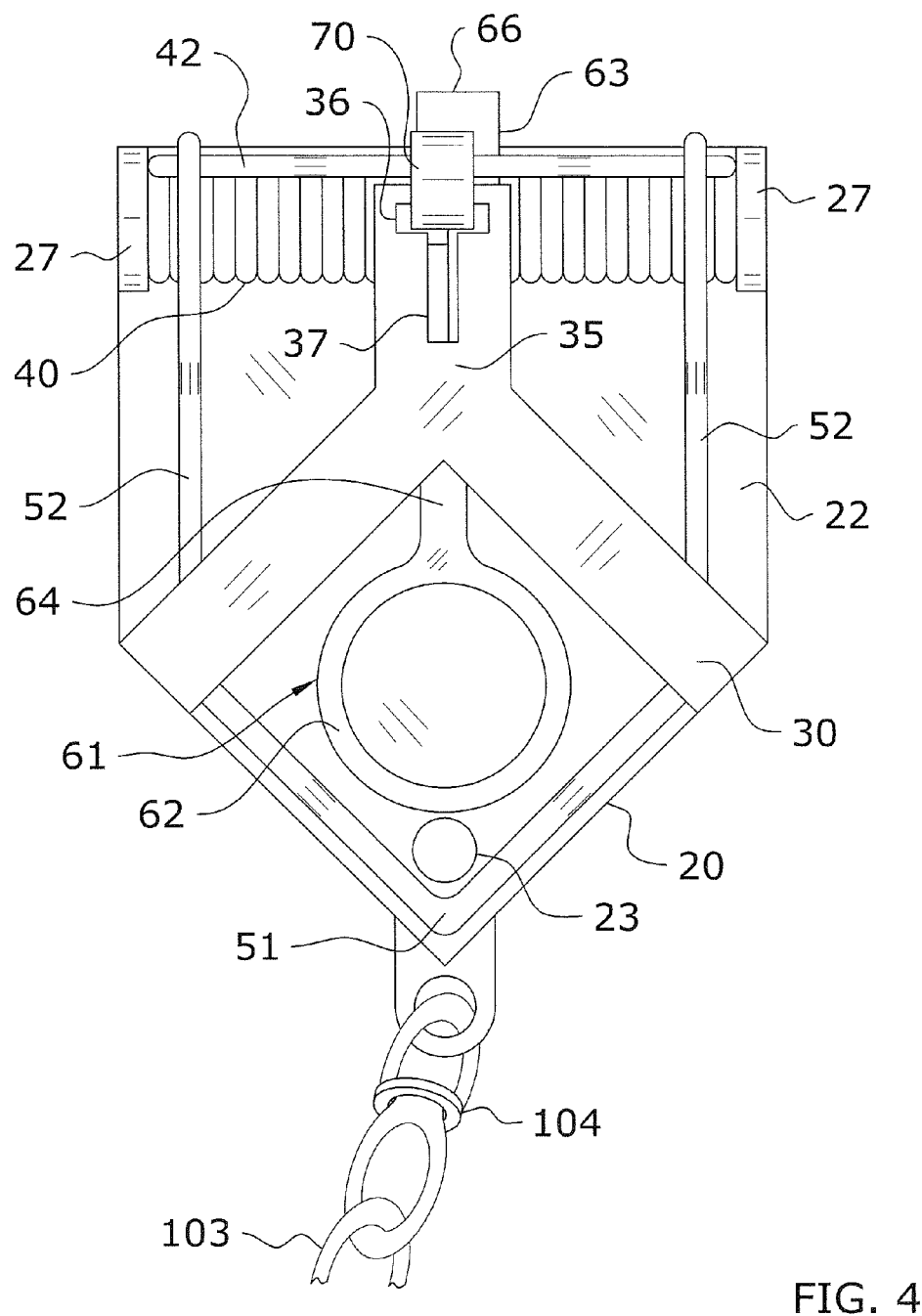
FIG. 4 is a top view of the present invention with the first trigger assembly.

When the first trigger assembly 60 is desired to be armed, the first trigger member 61 is slid away from the first latch dog 70 until the tab 66 of the first trigger member 61 aligns with the tab 75 of the first latch dog 70 and may be rested thereupon as illustrated in FIG. 2. The hook portion 71 retains the first latch dog 70 on one end and the tab 66 retains the first latch dog 70 on the opposite end, thus holding the cross member 42 inwards and the restraint member 50 in the armed position.

Figure 5:
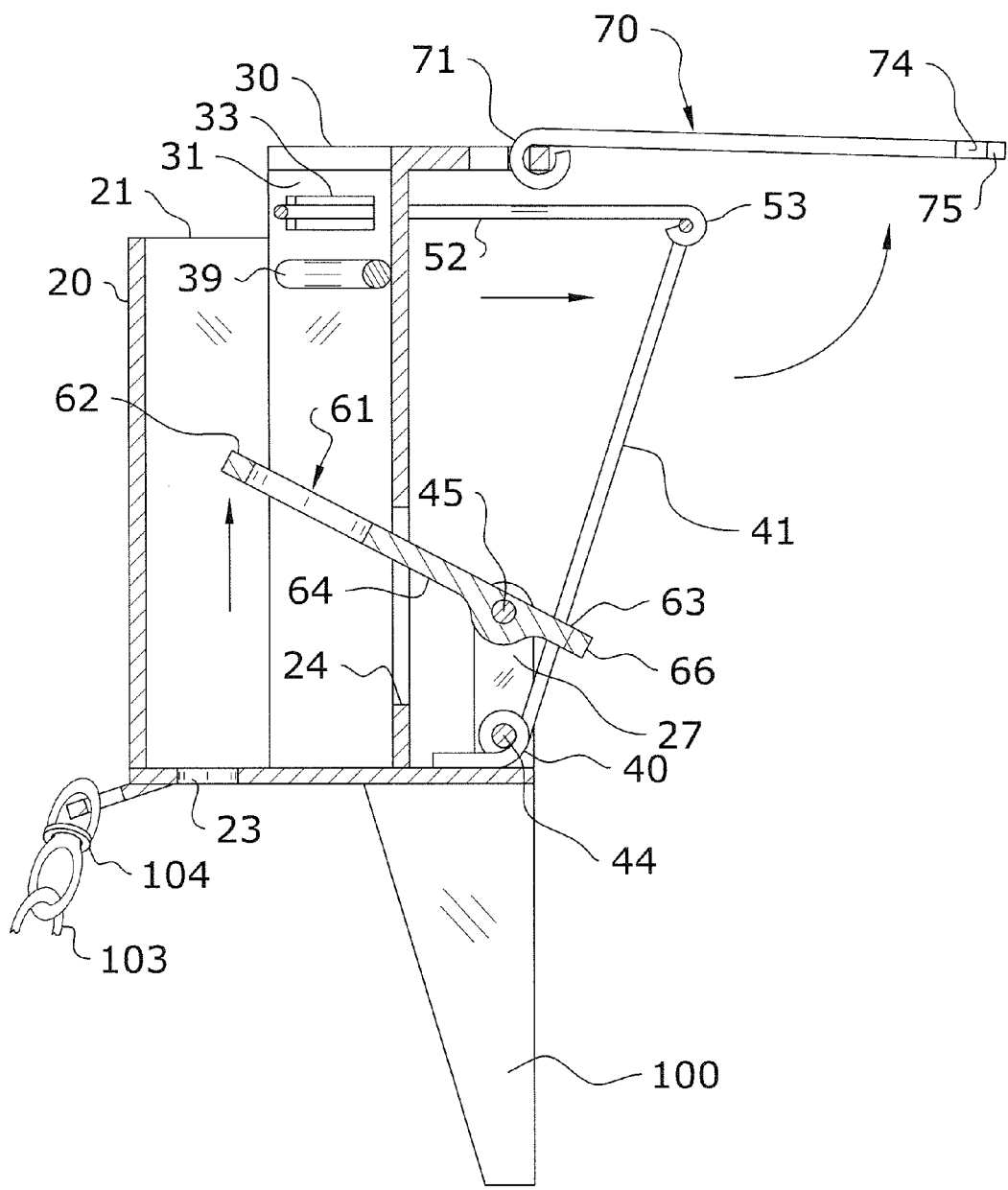
FIG. 5 is a side sectional view of the present invention showing a pulling force being applied to the first trigger member to engage the restraint member.
Figure 6:
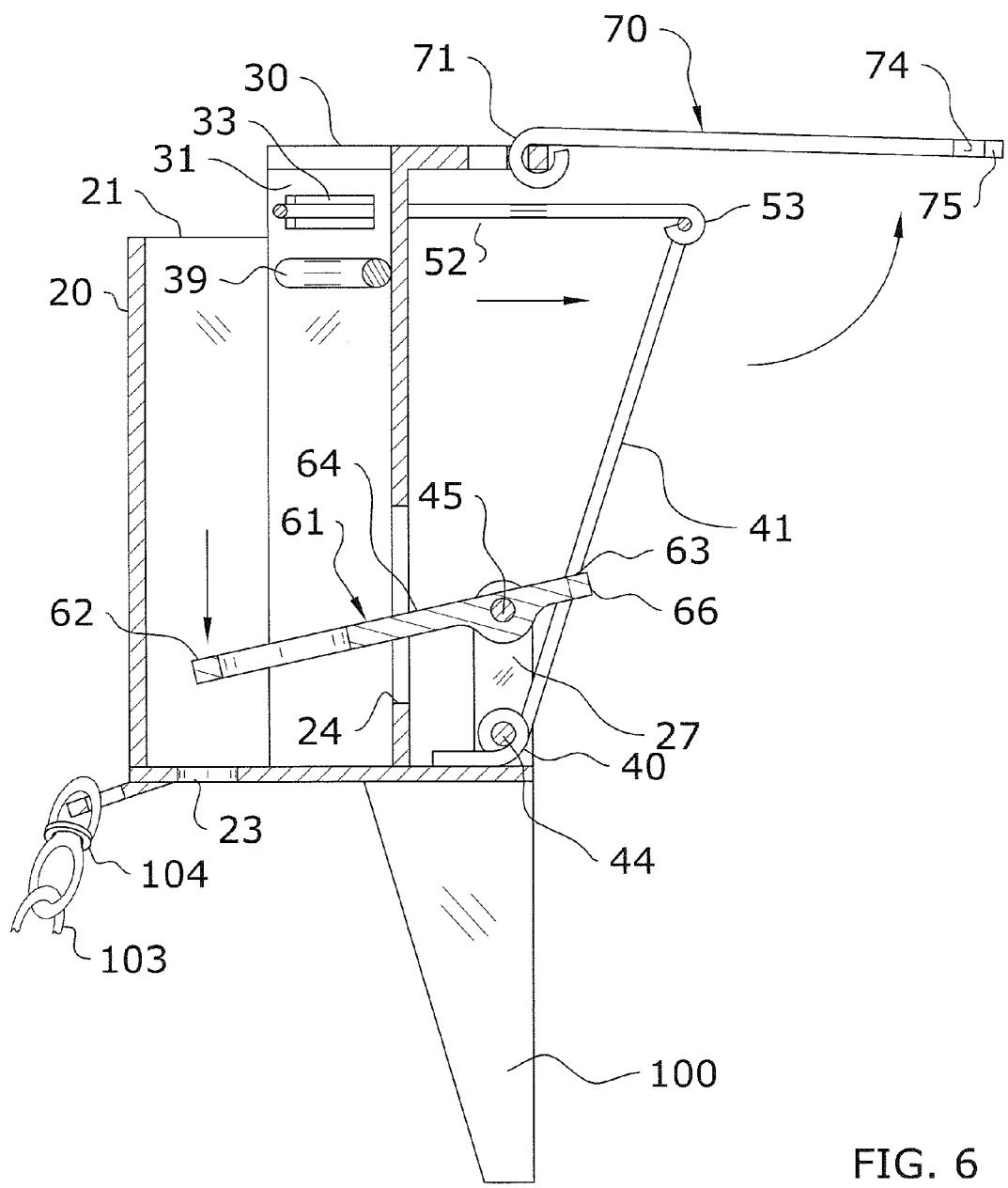
FIG. 6 is a side sectional view of the present invention showing a pushing force being applied to the first trigger member to engage the restraint member.
Figure 7:
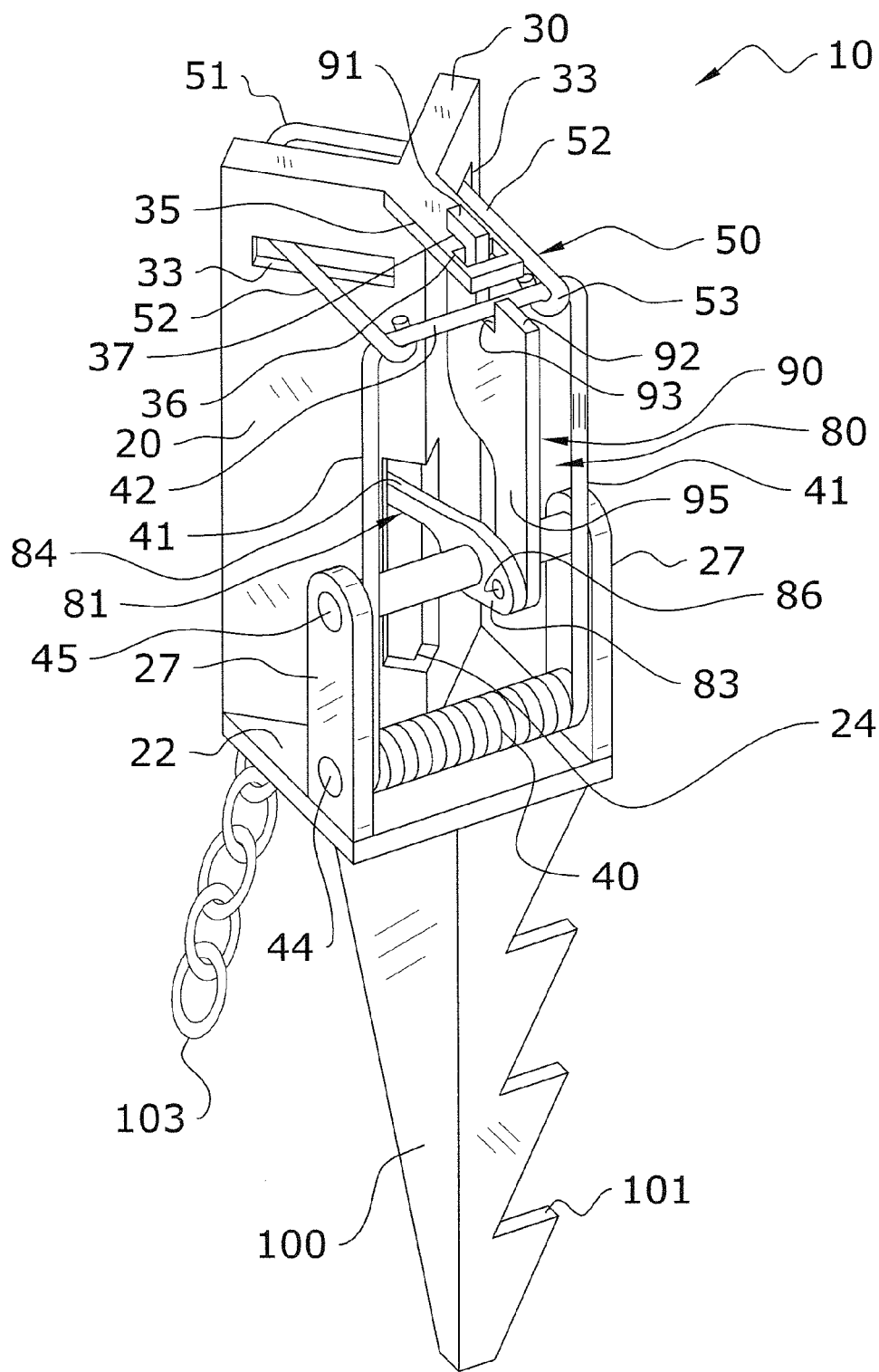
FIG. 7 is a rear upper perspective view of the present invention with the second trigger assembly.
Figure 8:
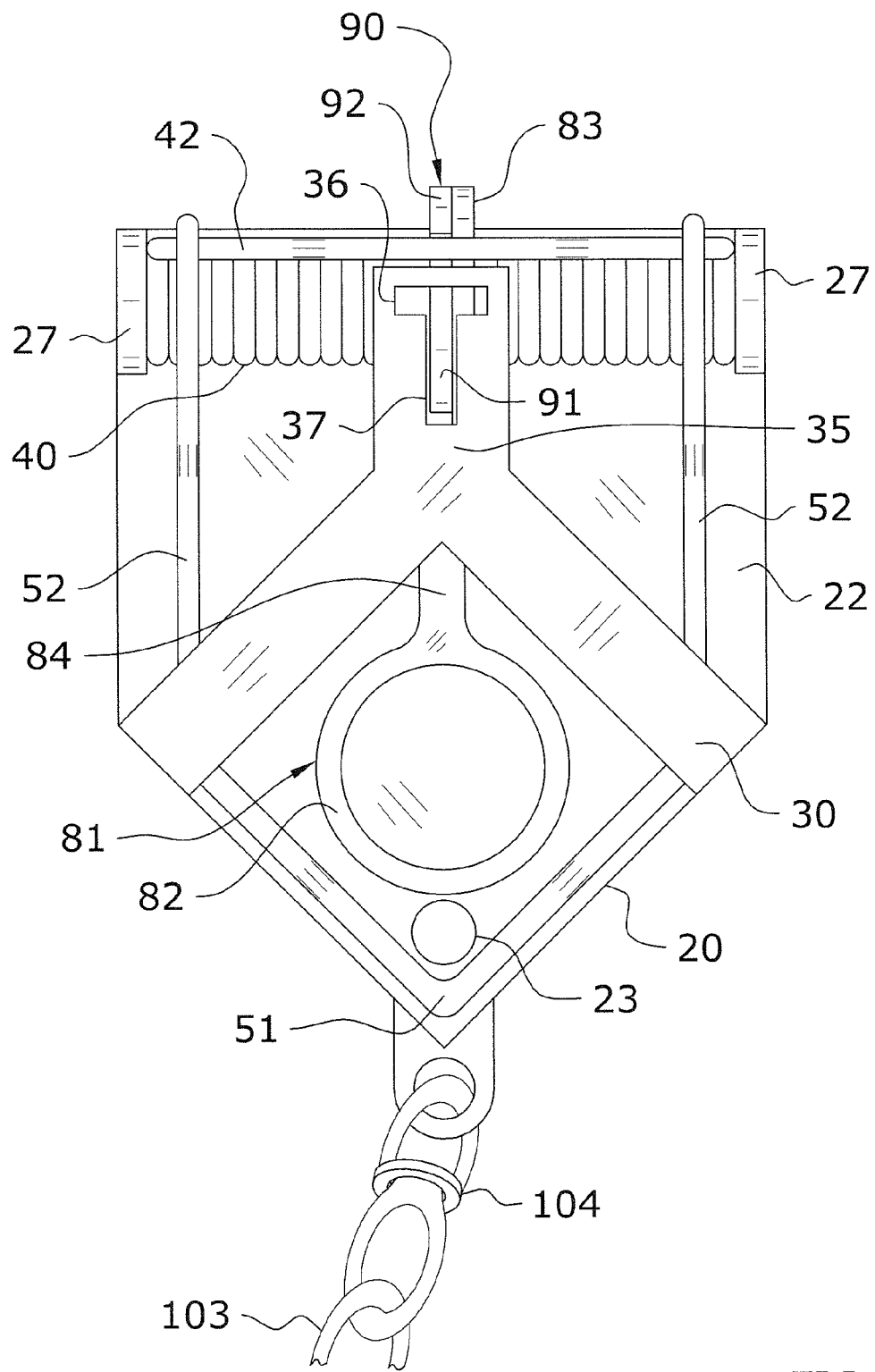
FIG. 8 is a top view of the present invention with the second trigger assembly.

When the trigger end 62 of the first trigger member 61 is either pushed or pulled, the tab 66 of the first trigger member 61 slides from the tab 75 of the first latch dog 70, either through the notch 74 of the first latch dog 70 or past the first latch dog 70, thus releasing the first latch dog 70 to pivot within the first notch 36 of the support 35 and release the cross member 42 as illustrated in FIGS. 5 and 6. The bias force of the spring 40 causes the cross member 42 to rapidly move outwardly, thus pulling the restraint member 50 rapidly outwardly towards the external grip member 30 and pinching the extremity 12 of the animal between the restraining portion 51 of the restraint member 50 and the grip members 30, 39.

When the second trigger assembly 80 is desired to be armed, the spring 40 is armed by pushing the cross member 42 towards the body 20 and tilting the opening down toward the ground allowing the heavier latch dog 90 to fall forward over the cross member 42 so the cross member 42 is positioned within the notch 93 of the of the second latch dog 90 and the cross member 42 is retained in position by the second extension 92 while the first extension 91 is extended within the second notch 37 of the support 35 to retain the second latch dog 90 in position when pressure is released from the spring 40. Thus, the latch dog 90 allows for easy setting of the trap 10 by simply pushing the spring 40 toward the body 20 and pivoting the body 20 so the latch dog 90 pivots into a set position to retain the spring 40 in the armed position.

Figure 12:
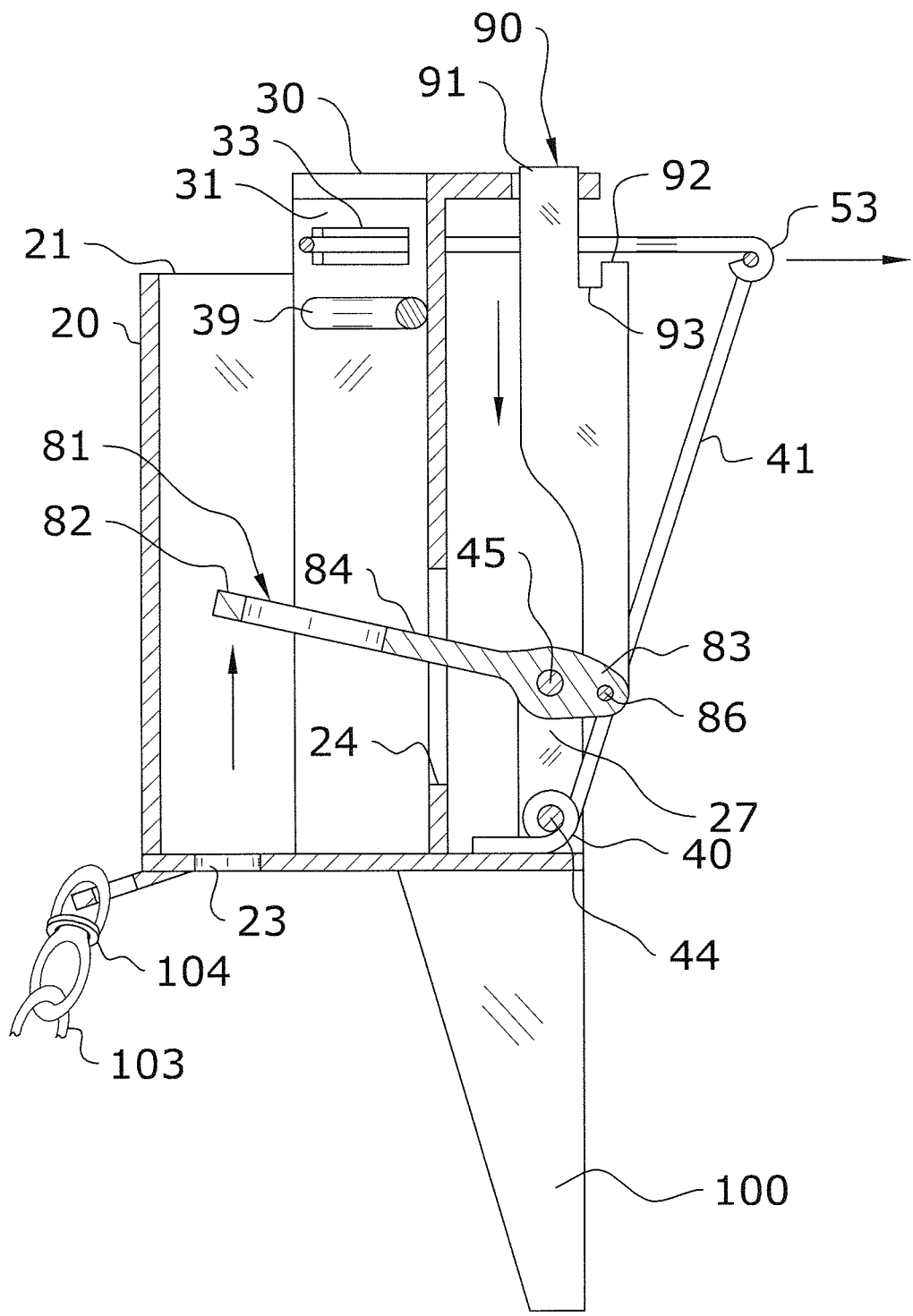
FIG. 12 is a side sectional view of the present invention showing a pulling force being applied to the second trigger member to release the restraint member.

When the trigger end 82 of the second trigger member 81 is pulled, the connector end 82 of the second trigger member 81 is forced downward thus pulling the second latch dog 90 downward so that the first extension 91 is removed from the second notch 37. Simultaneously, the second extension 92 moves downward past the cross member 42 allowing the cross member 42 to be released from the notch 93 and rapidly move outwards via the biased force of the spring 40 as illustrated in FIG. 12. The cross member 42 pulls the restraint member 50 rapidly outwardly towards the external grip member 30 and pinching the extremity 12 of the animal between the restraining portion 51 of the restraint member 50 and the grip members 30, 39 as illustrated in FIG. 13.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. In case of conflict, the present specification, including definitions, will control. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. An animal trap, comprising:
a hollow body having an entrance opening;
a spring supported adjacent said body;
a restraint member connected to said spring, said restraint member adapted to engage an extremity of an animal inserted into said body through said entrance opening; and
adapted to restrain said restraint member in an armed position;
said first trigger assembly adapted to restrain said restraint member in an armed position, wherein said first trigger assembly is adapted to release said restraint member from said armed position via a first directional force or a second directional force applied to a first trigger member of said first trigger assembly;
said first trigger assembly includes a first latch dog, said first latch dog releasable engages said first trigger member;
wherein said first latch dog has a first notch and wherein said first trigger member has a second notch;
wherein said first notch interlocks with said second notch in a safety position of said first trigger member.

2. The animal trap of claim 1, wherein said first trigger member rotates through said second notch to clear said first latch dog in said armed position.

3. The animal trap of claim 1, including a pivot rod supported adjacent said body, said first trigger member is pivotal upon said pivot rod, wherein said first trigger member is slidably along said pivot rod from said armed position to said safety position.

4. The animal trap of claim 1, including a second trigger assembly that is interchangeable with said first trigger assembly, wherein said second trigger assembly includes a second latch dog, said second latch dog includes a first notch extending within a forward end, said first notch releasably engages said spring.

5. The animal trap of claim 4, wherein said body has an outwardly protruding tab, said tab having a second notch, said second notch removably retains said forward end of said second latch dog.

6. The animal trap of claim 5, wherein a rearward end of said second latch dog is pivotally coupled to said second trigger member along a pivot rod.

7. The animal trap of claim 6, wherein said second latch dog is heavier than said second trigger member to cause said second trigger member to pivot when a gravitational force is applied to said second latch dog towards said restraint member.

8. The animal trap of claim 1, including a ground support extending from said body, said ground support having a tubular member attached thereto into which a removable support is removably connected to.

9. An animal trap, comprising:
a hollow body having a first longitudinal end and a second longitudinal end, said first longitudinal end having an upper portion extending beyond a lower portion, said first longitudinal end having an entrance opening;
said upper portion having at least one elongated slot extending therethrough;
an external grip member forwardly extending from said first longitudinal end, said external grip member being comprised of a V-shape and said external grip member having at least one notch extending therethrough;
a biased restraint member extending through at least one elongated slot within said upper portion and across said entrance opening of said body, said restraint member having a restraining portion comprised of a V-shape, said restraint member adapted to move towards said upper portion when released to form a square cross-sectional shape with said V-shaped external grip member and said V-shaped restraining portion and tightly engage four sides of an extremity of an animal inserted into said body through said entrance opening;
a pivotal trigger member extending within said body between said first longitudinal end and said second longitudinal end; and
a latch means interconnecting said trigger member with said restraint member for releasing said restraint member when said trigger member is engaged.

10. The animal trap of claim 9, said body comprised of a square cross-sectional shape.

11. The animal trap of claim 9, wherein said trigger member has a circular-shaped end within said body.

12. The animal trap of claim 9, including an internal grip member extending from said first longitudinal end, said internal grip member being comprised of a V-shape.

13. The animal trap of claim 12, wherein said internal grip member parallels said external grip member.

14. The animal trap of claim 12, wherein said restraint member is movable between said external grip member and said internal grip member.

15. The animal trap of claim 9, including a ground stake extending from said body.

16. The animal trap of claim 9, including an anchor chain connected to said body.

17. An animal trap, comprising:
a hollow body having an entrance opening;
said body comprised of a square cross-sectional shape;
an external grip member forwardly extending from said body, said external grip member being comprised of a V-shape and said external grip member having at least one elongated slot extending therethrough;
a support extending outwardly from said external grip member, said support having a first notch and a second notch, said first notch and said second notch forming a T-shape;
an internal grip member extending from said body, said internal grip member being comprised of a V-shape;
wherein said internal grip member parallels said external grip member;
a torsion spring supported adjacent said body, said torsion spring having a pair of extension legs paralleling said body and a cross member connecting distal ends of said pair of extension legs;
a restraint member connected to said cross member, wherein said restraint member is movable between said external grip member and said internal grip member through said at least one elongated slot;
said restraint member having a restraining portion comprised of a V-shape, said restraining portion adapted to move towards said external grip member when released to form a square cross-sectional shape with said V-shaped external grip member and said V- shaped restraining portion and tightly engage four sides of an extremity of an animal inserted into said body through said entrance opening;
at least two interchangeable triggering assemblies, each of said interchangeable triggering assemblies adapted to restrain said restraint member in an armed position;
said interchangeable triggering assemblies including a first trigger assembly and a second trigger assembly;
said first trigger assembly adapted to release said restraint member from said armed position via a pulling force or a pushing force applied to a first trigger member of said first trigger assembly;
wherein said first trigger assembly includes a first latch dog, said first latch dog releasably engages said first trigger member;
wherein said first trigger member has a first trigger end comprised of a ring shape;
wherein said first latch dog has a third notch and wherein said first trigger member has a fourth notch;
wherein said third notch interlocks with said fourth notch in a safety position of said first trigger member;
wherein said first trigger member rotates through said fourth notch to clear said first latch dog in said armed position of said first trigger member;
a pivot rod supported adjacent said body, said first trigger member pivotal upon said pivot rod, wherein said first trigger member is slidably along said pivot rod from said armed position to said safety position;
said second trigger assembly adapted to release said restraint member from said armed position via only said pulling force applied to a second trigger member of said second trigger assembly, said pulling force being opposite said pushing force with respect to said body;
wherein said second trigger assembly includes a second latch dog, said second latch dog includes a fifth notch extending within a forward end of said second latch dog, said fifth notch of said second latch dog releasably engages said cross member;
wherein a rearward end of said second latch dog is pivotally coupled to said second trigger member along a second pivot rod;
wherein said second trigger member has a second trigger end comprised of a ring shape;
a ground support extending from said body, said ground support having a plurality of jagged teeth; and
an anchor chain connected to an animal trap.

* * * * *